Patented Dec. 18, 1951

2,579,297

UNITED STATES PATENT OFFICE 2,579,297

CHLORINATED CAMPHANE INSECTICIDAL COMPOSITION

George Allen Buntin, Wilmington, Del., assignor to Hercules Powder Company, Wilmington, Del., a corporation of Delaware No Drawing. Application April 8, 1948,
Serial No. 19,866

8 Claims. (Cl. 167—30)

This invention relates to insecticidal compositions and more particularly to insecticidal compositions containing a highly chlorinated camphane as the toxic ingredient.

Among the more commonly used insecticidal toxicants are the naturally occurring products, pyrethrum, rotenone, and nicotine. These natural products have the very great disadvantage of not being uniform in their insecticidal activity and thus make it difficult to formulate insecticidal compositions. Many synthetic products have been suggested in the past as substitutes for these toxicants; however, they are usually lacking in one respect or another. Either they do not have a high enough killing power and must be used in concentrations which cause irritation to the user, or, if they are sufficiently toxic, they are also toxic to forms of animal life other than insect pests.

Now in accordance with this invention it has been found that insecticidal compositions containing as the toxic ingredient a chlorinated camphane which has a chlorine content of from about 52% to about 75% possess an unusual degree of insecticidal activity. Because of the very high killing power of a chlorinated camphane containing 52% to 75% chlorine, extremely dilute solutions of these toxicants are effective.

The following examples will illustrate the preparation and insecticidal activity of insecticidal compositions containing these chlorinated camphanes.

Example 1

Camphane was prepared by hydrogenating tricyclene. The tricyclene was dissolved in methylcyclohexane and subjected to a hydrogen pressure, in a rocker-type bomb, of 500 lb./sq. in. in the presence of a 5% palladium on carbon catalyst at a temperature of 150° C. The hydrogenation was complete in one hour. The cooled solution was filtered to remove the catalyst and was distilled at atmospheric pressure to remove the major portion of the solvent. The residue was then cooled in a Dry Ice alcohol bath whereupon the camphane crystallized. The crystals were separated by filtration and dried in a vacuum desiccator. The camphane so obtained had a melting point of 148°–150° C.

One part of the above camphane was dissolved in about 10 parts of carbon tetrachloride. Chlorine was then passed into the agitated solution which was exposed to ultraviolet illumination. The temperature of the chlorination was 152°–154° F. A total of 5 samples were removed at intervals during the chlorination. The carbon tetrachloride was removed from each of these samples by sparging with nitrogen at 100° C. under a pressure of 25–30 mm. The products were white, waxy solids.

These chlorinated camphanes were tested for their insecticidal activity against houseflies. The test for insecticidal activity against houseflies was made in the following manner and is referred to as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 0.5% solutions in deodorized kerosene of the above 5 chlorinated camphanes are given in the following table. The data are an average of a series of tests made on each solution.

| Chlorination Time in Hrs. | Per Cent Chlorine | Per Cent Dead in 24 Hrs. | O. T. I. Difference |
|---|---|---|---|
| 7  | 49.4 | 36  | −18 |
| 9  | 54.0 | 67  | +13 |
| 11 | 59.4 | 97  | +43 |
| 14 | 67.5 | 100 | +46 |
| 22 | 73.9 | 59  | +5  |

Example 2

An insecticidal dust was prepared by dissolving a chlorinated camphane containing 67.5% chlorine in kerosene and spraying this solution onto fuller's earth in such proportions as to give a mixture containing 40% of the chlorinated camphane. This material was then ground and diluted with pyrophyllite to prepare a final dust containing 20% of the chlorinated camphane. The dust was tested and found to be very effective in controlling cotton insects.

The chlorinated camphane which is used as the toxic ingredient of the insecticidal compositions in accordance with this invention should contain an amount of chlorine of from about 52% to about 75% and preferably from about 60% to about 72%. As may be seen from the foregoing examples, a chlorinated camphane having a chlorine content within these ranges has a very high insecticidal activity, a kill of approximately 100% being obtained within the more preferable range.

The camphane which is chlorinated to obtain the chlorinated camphanes containing from about 52% to about 75% chlorine may be obtained by hydrogenating tricyclene or bornylene. The hydrogenation may be carried out by any of the usual hydrogenation procedures. In the case of tricyclene, a platinum or palladium hydrogenation catalyst is used. Camphane is a crystalline material which may be separated and, if desired, purified by recrystallization.

The chlorination of the camphane is readily carried out by dissolving the camphane in a solvent and passing chlorine into the solution. Suitable solvents for the chlorination are chloroform, carbon tetrachloride, pentachloroethane, etc. Chlorination catalysts may be used if desired, ultraviolet light being particularly efficient.

The insecticidal compositions of this invention may be made up of the chlorinated camphane admixed with any suitable type of diluent. If a liquid spray is desired, the chlorinated camphane may be dissolved in any convenient solvent, such as deodorized kerosene, or it may be dispersed in water to form an aqueous spray. Insecticidal dusts may be prepared by placing the chlorinated camphane on a diluent or carrier such as powdered carbon, kieselguhr, bentonite, pyrophyllite, etc.

For many purposes it may be desirable to use the chlorinated camphane in combination with other insecticidal toxicants. Many toxicants have a very high knockdown in relatively dilute solutions, but much higher concentrations must be used in order to obtain the desired degree of kill. Due to the very high degree of killing power which a chlorinated camphane containing from about 52% to about 75% chlorine possesses, it may be added to such toxicants, thereby enabling the use of a much more dilute solution than would otherwise be possible in the finished insecticide. Toxicants with which the chlorinated camphane may be combined include such compounds as rotenone, pyrethrum, and organic thiocyanates such as alkyl thiocyanates, thiocyano ethers such as $\beta$-butoxy-$\beta'$-thiocyanoethyl ether, and terpene thiocyanoacylates such as isobornyl thiocyanoacetate, fenchyl thiocyanoacetate, and isobornyl $\alpha$-thiocyanopropionate.

The very high insecticidal activity of a chlorinated camphane containing from about 52% to about 75% chlorine is illustrated by the foregoing examples. The amount of the chlorinated camphane to be admixed with the diluent depends upon the use to which the insecticidal composition will be put. For example, for use as a household spray, the chlorinated camphane is very effective at a concentration of 0.5% in deodorized kerosene, but when used as an agricultural dust a concentration of 10% to 20% or more may be desirable. The insecticidal compositions of this invention are useful in combatting flies, mosquitoes, roaches, moths, carpet beetles, bed bugs, and many other pests.

This application is a continuation-in-part of my application for United States Letters Patent Serial Number 609,027, filed August 4, 1945, now abandoned.

What I claim and desire to protect by Letters Patent is:

1. An insecticidal composition comprising the product obtained by chlorination of camphane with chlorine gas at an elevated temperature, below the temperature at which the product decomposes, to a chlorine content of from about 52% to about 75% chlorine and an insecticidal adjuvant as a carrier therefor.

2. An insecticidal composition comprising the product obtained by chlorination of camphane with chlorine gas at an elevated temperature, below the temperature at which the product decomposes, to a chlorine content of from about 60% to about 72% chlorine and an insecticidal adjuvant as a carrier therefor.

3. An insecticidal composition comprising the product obtained by chlorination of camphane with chlorine gas at an elevated temperature, below the temperature at which the product decomposes, to a chlorine content of from about 52% to about 75% chlorine and a hydrocarbon solvent insecticidal adjuvant as a carrier therefor.

4. An insecticidal composition comprising the product obtained by chlorination of camphane with chlorine gas at an elevated temperature, below the temperature at which the product decomposes, to a chlorine content of from about 52% to about 75% chlorine and a solid insecticidal adjuvant as a carrier therefor.

5. An insecticidal composition comprising an aqueous insecticidal dispersion of the product obtained by the chlorination of camphane with chlorine gas at an elevated temperature, below the temperature at which the product decomposes, to a chlorine content of from about 52% to about 75% chlorine.

6. An insecticidal composition comprising the product obtained by chlorination of camphane with chlorine gas at an elevated temperature, below the temperature at which the product decomposes, to a chlorine content of from about 60% to about 72% chlorine and a hydrocarbon solvent insecticidal adjuvant as a carrier therefor.

7. An insecticidal composition comprising the product obtained by chlorination of camphane with chlorine gas at an elevated temperature, below the temperature at which the product decomposes, to a chlorine content of from about 60% to about 72% chlorine and a solid insecticidal adjuvant as a carrier therefor.

8. An insecticidal composition comprising an aqueous insecticidal dispersion of the product obtained by the chlorination of camphane with chlorine gas at an elevated temperature, below the temperature at which the product decomposes, to a chlorine content from about 60% to about 72% chlorine.

GEORGE ALLEN BUNTIN.

REFERENCES CITED

The following references are of record in the file of this patent:

UNITED STATES PATENTS

| Number | Name | Date |
|---|---|---|
| 1,366,106 | Weeks | Jan. 18, 1921 |
| 2,010,841 | Bender | Aug. 13, 1935 |
| 2,337,043 | Hasselstrom et al. | Dec. 21, 1943 |

OTHER REFERENCES

Simonsen, "The Terpenes," vol. II, pp. 142–143 and 281 (1932).

Roark, "A Second Index of Patented Mothproofing Materials," U. S. D. A. Bureau of Chemistry and Soils, Insecticide Division, February 1933, p. 84, 167—37.

Desalbres et al., Chimie and Industrie, vol. 58, p. 443–448 (1947), thru Chem. Abstract. vol. 42, p. 2719 (1948). (Photostat ordered for 167–30.)

Frankforter, J. Am. Chem. Soc., vol. 28, p. 1461–1465 (1906).

Simonsen, "The Terpenes," vol. II, pp. 140, 221 (1932).